United States Patent
Hilber et al.

(10) Patent No.: US 12,055,953 B1
(45) Date of Patent: Aug. 6, 2024

(54) GAS-MIXING POWER SYSTEMS AND METHODS FOR OPERATING POWER SYSTEMS

(71) Applicant: NexTier Completion Solutions Inc., Houston, TX (US)

(72) Inventors: Aaron Hilber, Houston, TX (US); Pravin Patel, Sugar Land, TX (US); Emeka Ononogbu, Houston, TX (US); Stephen Edelblut, Houston, TX (US)

(73) Assignee: NexTier Completion Solutions Inc., Houston, TX (US)

( * ) Notice: Subject to any disclaimer, the term of this patent is extended or adjusted under 35 U.S.C. 154(b) by 15 days.

(21) Appl. No.: 17/649,573

(22) Filed: Feb. 1, 2022

Related U.S. Application Data

(60) Provisional application No. 63/144,266, filed on Feb. 1, 2021.

(51) Int. Cl.
*G05D 11/13* (2006.01)
*F02D 33/00* (2006.01)

(52) U.S. Cl.
CPC ............ *G05D 11/13* (2013.01); *F02D 33/00* (2013.01); *G05D 11/131* (2013.01)

(58) Field of Classification Search
CPC ........ F02D 33/00; G05D 11/13; G05D 11/131
See application file for complete search history.

(56) References Cited

U.S. PATENT DOCUMENTS

| | | | | |
|---|---|---|---|---|
| 8,301,359 B1* | 10/2012 | Sagar | .................. | G05B 19/042 |
| | | | | 123/1 A |
| 9,624,863 B1* | 4/2017 | Ge | ...................... | F02D 19/0647 |
| 9,784,152 B2* | 10/2017 | Monros | .............. | F02D 19/0694 |
| 10,113,493 B2* | 10/2018 | Atterberry | ....... | F02M 35/10157 |
| 2014/0041633 A1* | 2/2014 | Kim | .................... | F02D 41/0027 |
| | | | | 123/456 |
| 2015/0000638 A1* | 1/2015 | Monros | ................. | F02D 19/081 |
| | | | | 123/456 |

* cited by examiner

*Primary Examiner* — John Kwon
*Assistant Examiner* — Johnny H Hoang
(74) *Attorney, Agent, or Firm* — AVEK IP, LLC

(57) ABSTRACT

A power system includes a power source, field gas supply, and natural gas supply, and is operable using a gas mixture comprising field gas from the field gas supply and natural gas from the natural gas supply. A ratio of field gas to natural gas is adjusted based on sensed property of the field and/or natural gas, change in a condition of the field and/or natural gas, measured emissions from the power source, predicted emissions from the power source, and/or direct/indirect feedback from the power source. A method for operating a power system includes: connecting a mixing gas line and a field gas line to a power source at work site; determining a ratio of mixing gas to field gas; combining mixing gas from the mixing gas line and field gas from the field gas line based on the determined ratio; and operating the power source with the combined gases.

30 Claims, 4 Drawing Sheets

GAS-MIXING POWER SYSTEMS AND METHODS FOR OPERATING POWER SYSTEMS

CROSS-REFERENCE TO RELATED APPLICATIONS

This application claims the benefit of priority of U.S. Provisional Patent Application No. 63/144,266, filed Feb. 1, 2021, the entire disclosure of which is incorporated herein by reference.

FIELD OF THE DISCLOSURE

The disclosure relates generally to the field of power sources, including multifuel engines, natural gas engines, and turbines. Specifically, the disclosure relates to power sources utilizing a gas mixing system.

SUMMARY

The following presents a simplified summary of the invention in order to provide a basic understanding of some aspects of the invention. This summary is not an extensive overview of the invention. It is not intended to identify critical elements of the invention or to delineate the scope of the invention. Its sole purpose is to present some concepts of the invention in a simplified form as a prelude to the more detailed description that is presented elsewhere herein.

In one embodiment, a power system includes a power source, a field gas supply, and a natural gas supply. The power system is operable using a gas mixture having field gas from the field gas supply and natural gas from the natural gas supply. A ratio of field gas to natural gas is manually or automatically adjusted based on at least one item selected from the group consisting of: a change in a condition of the field gas, measured emissions from the power source, predicted emissions from the power source, direct feedback from the power source, indirect feedback from the power source, a sensed property of the natural gas, and a change in a condition of the natural gas.

In another embodiment, a power system includes a power source, a field gas supply, a mixing gas supply, and means for automatically mixing field gas from the field gas supply and mixing gas from the mixing gas supply to create a gas mixture. A ratio of the field gas to the mixing gas in the gas mixture is automatically adjusted based at least partially on an item selected from the list consisting of: a sensed property of the field gas, a change in a condition of the field gas, measured emissions from the power source, predicted emissions from the power source, direct feedback from the power source, indirect feedback from the power source, a sensed property of the mixing gas, and a change in a condition of the mixing gas. Means are also included for automatically selecting between the field gas and the gas mixture and automatically providing the selected item to the power source. The power system is operable using the gas mixture.

In still another embodiment, a method for operating a power system includes first operably connecting a mixing gas line and a field gas line to a power source at a work site. The method continues by determining a ratio of mixing gas to field gas based on a sensed condition of field gas in the field gas line, a change in a condition of the field gas, measured emissions from the power source, predicted emissions from the power source, direct feedback from the power source, indirect feedback from the power source, a sensed property of the mixing gas, and/or a change in a condition of the mixing gas. Mixing gas from the mixing gas line and field gas from the field gas line are then mixed based on the determined ratio. Finally, the power source is operated at least part time with the combined mixing gas and field gas.

BRIEF DESCRIPTION OF THE SEVERAL VIEWS OF THE DRAWINGS

Illustrative embodiments of the present disclosure are described in detail below with reference to the attached drawing figures.

DETAILED DESCRIPTION

Power systems are known in the art, including engine-powered generators, turbine-powered generators, and multifuel power sources. Multifuel power sources, such as multifuel engines, natural gas engines, and turbines, are usable with a plurality of fuel sources, such as a diesel fuel source and/or a natural gas source. Conventional multifuel power sources are configured to simultaneously or serially use each of these fuel sources, which gives the multifuel power system great flexibility. Multifuel power systems are further desirable because of the ability to select a primary fuel source that is more desirable than another fuel source. Fuel sources may be more desirable by being more plentiful, cheaper, having a higher quality, et cetera. This is especially important considering that users often wish to use natural gas produced in local or nearby wells (sometimes referred to herein as "field gas") as a fuel source over diesel fuel, given that diesel fuel is generally more expensive than natural gas and/or may generate more emissions than using natural gas.

However, conventional power systems suffer from several drawbacks, as the power source's ability to operate depends on a variety of factors including engine load, speed, ambient temperature, fuel pressure, fuel volume, fuel composition, et cetera. And while natural gas may be a more desirable fuel source, field gas typically requires treatment in order to be usable with most power sources. Field gas is determined to be in need of treatment if the field gas contains too much water and/or if the field gas is too "rich". Consuming untreated field gas in an power source may cause damage and/or otherwise reduce the capacity of the machine to produce power. Additionally, the supply of field gas may be insufficient, thus requiring a multifuel power source to heavily rely on a supplemental fuel source such as diesel. This of course defeats the purpose of the multifuel power system, as it can no longer sufficiently utilize the plurality of fuel sources. Embodiments of the power system with gas mixing functionality described herein may address one or more of these issues.

Figure 1:
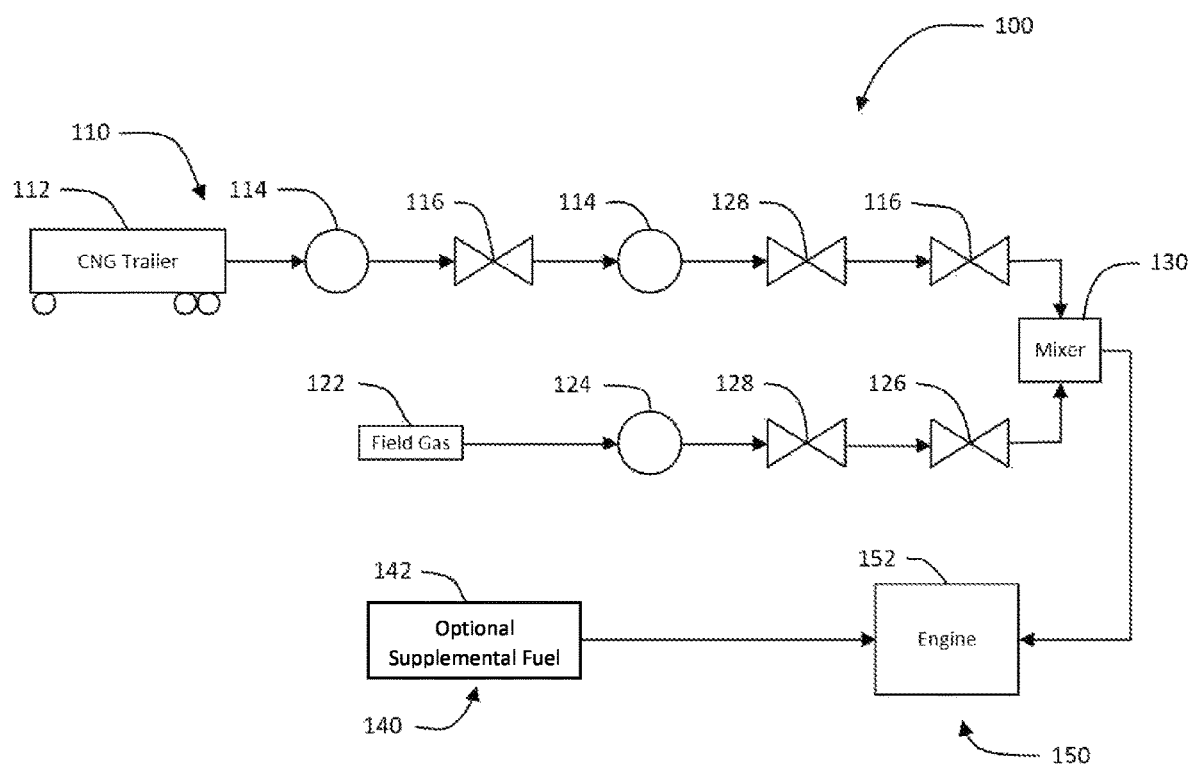
FIG. 1 is a diagram depicting a multifuel power system with a natural gas mixer, according to an embodiment of the present disclosure.

Focus is directed now to FIG. 1, which shows an embodiment 100 of a power system having a lean natural gas line 110, a field gas line 120, a mixing device 130, an alternate fuel line 140 (e.g., a diesel fuel line), and a power source 150. The power system 100 may be used at a work site to produce mechanical or electrical power (e.g., electricity) using any suitable type of power source now known or subsequently developed. The power source 150 in the embodiment 100 is a multifuel power source that may be selectively operated using diesel fuel from the diesel fuel source 142 alone, or in combination with lean natural gas. Additionally, or alternately, the multifuel power system 100 may mix natural gas from both the lean natural gas line 110 and the field gas line 120 (e.g., in the mixing device 130) to provide a mixed natural gas to operate the power source 150. And when appropriate, the power source 150 may operate from the field gas.

The lean natural gas line 110 may include one or more compressed or liquified natural gas transport trailers 112 configured to store and transport compressed or liquified natural gas. The natural gas trailer 112 may be any suitable trailer now known or subsequently developed. In some embodiments, the natural gas trailer 112 may include, for example, one or more flow control valves (e.g., a fixed orifice device, variable orifice device, throttle valve, choke valve, or any other device that controls flow rate) to control the flow of natural gas from the trailer 112. The natural gas in the trailer 112 may be "lean" natural gas, or natural gas that has been pretreated, such as by having excess water removed, excess heavy hydrocarbons removed, and/or by being "sweetened," which is a process that removes unwanted impurities (e.g., Hydrogen Sulfide). As described in greater detail herein, in operation, the natural gas trailer 112 may be used in conjunction with the field gas line 120 to provide the power source 150 with a suitable natural gas supply.

The field gas line 120 may include a field gas source 122 that may use any suitable technology now known or subsequently developed for extracting natural gas (i.e., field gas) from a worksite (e.g., the earth). In embodiments, the field gas may be trucked or piped from the field gas source 122 to the power system 100. As noted above, the field gas may not be ideal for use in the power source 150. The quality and amount of the field gas extracted may vary from location to location and/or from time to time during extraction. As such, field gas extracted from the field gas source 122 may be blended with lean natural gas from the natural gas trailer 112 to provide a more ideal natural gas mixture for use in the multifuel power source 150. The ratio of lean natural gas from the natural gas trailer 112 to the field gas source 122 is based on the composition of the field gas and is adjustable in order to meet the requirements of the particular power source. In other words, the rich field gas from the field gas source 122 may be diluted by the lean natural gas in order to increase the methane number and decrease the BTU content of the mixed gas, wherein the ratio is based on the original composition of the field gas and the manufacturer requirements of the power source.

Additionally, the flow of field gas from the field gas source 122 may be two phase (e.g., 90% gaseous hydrocarbons and 10% liquid hydrocarbons on either a mass or mol basis). Two phase fuel sources may not be suitable for the power source, affecting the power output or even damaging the power source. The system 100 may be configured, e.g., via the heater 124 and/or the pressure regulator 126, to flash any liquid hydrocarbons in the field gas line 120 to ensure that the field gas stream is 100% vapor (or has a vapor fraction of 1.0). The temperature of the field gas in the field gas line 120 may be regulated to keep temperature of the process gas above the hydrocarbon dew point and the water dew point to avoid liquid or liquid droplets from entering the power source 150. Temperature regulation in the system 100 may be accomplished using any device or devices now known or later developed. In some embodiments, the heater 124 controls the temperature of the field gas. In further embodiments, the temperature of the field gas is controlled with one or more bolt-on heating devices such as heat tracing placed around the pipes, probes placed inside of the pipes, and/or other heating devices.

In the event that the temperature of the field gas in the field gas line 120 dips below the expected dew points, automatic safety shutdowns (e.g., closure of valves) may be triggered to isolate the field gas supply. In such an event, the system 100 may switch to 100% lean natural gas and/or diesel to fuel the power source 150. Other methods of detecting two-phase flow may additionally or alternatively be utilized, such as using meter technology and/or determining differential pressure across filters, as is known in the art.

The field gas and the lean natural gas may be blended in the mixing device 130, which may be any suitable mixing device now known or subsequently developed. Once the gases are mixed, the mixed gas is routed to the power source 150. In some embodiments, the mixing device 130 may be foregone; the lean natural gas line 110 and field gas line 120 may simply be injected into a singular line for transport to the power source 150. Upon mixing, so long as the lean natural gas line 110 is odorized prior to arriving onsite, the resultant mixed gas is odorized unlike typical conventional field gas streams that remain unodorized post-treatment.

The lean natural gas line 110 and the field gas line 120 may use any suitable number, type, and/or configuration of heaters 114, 124, pressure regulators 116, 126, flow control valves 128, and/or sensors to adequately prepare the lean natural gas and the field gas for mixing and to monitor the mixed gas after blending. These components may be any suitable technology now known or subsequently developed. The components, together with any required pipe sections, may be provided as a single skid. Accordingly, the skid may be configured to regulate temperature, pressure, and metering of the lean natural gas and field gas. The skid may be trailer mounted or skid mounted.

The ability to mix a sufficient amount of lean natural gas from the natural gas trailer 112 with extracted natural gas from the field gas source 122 is important in order to provide a high enough quality natural gas mixture for use in the power source 150. Accordingly, in some embodiments, the rate and/or ratio of mixture of the lean natural gas with the impure field gas may be predetermined, and may be based on the requirements of the specific power source 150. For example, the lean natural gas line 110 and the field gas line 120 may be set (e.g., by using the pressure regulators 116, 126 and/or the flow control valves 128) to mix and produce the desired natural gas combination. In locations where the field gas from the field gas source 122 is generally acceptable, a lower ratio of lean natural gas from the natural gas trailer 112 may be used. In locations where the field gas from the field gas source 122 is of a lesser quality, a higher ratio of lean natural gas from the natural gas trailer 112 may be used. In locations and/or at times where the availability of the field gas from the field gas source 122 is diminished (e.g., when the field gas source 122 is running out), a higher ratio of lean natural gas from the natural gas trailer 112 may be used to provide an adequate amount of natural gas to the power source 150.

In some embodiments, the lean natural gas may entirely replace the field gas, such as when the field gas supply is interrupted, or the volume or pressure of the field gas delivered to the site is inadequate. In such cases, the system may automatically switch to solely using lean natural gas without field gas. For example, if the lean natural gas and field gas were blended according to a 50/50 ratio, and the field gas supply were interrupted, the system may automatically switch to a 0/100 ratio of field gas to lean natural gas in order to maintain interrupted fuel supply to the power source 150. Further, when appropriate, the system may automatically switch to solely using field gas without the mixing gas. For example, if the lean natural gas and field gas were blended according to a 50/50 ratio, and it is determined that the field gas is of sufficient quality, the system may automatically switch to a 100/0 ratio of field gas to lean natural gas.

In some cases, a user may make a determination as to which fuel to primarily use based on variables such as the price and/or availability of the lean natural gas, field gas, and diesel fuel used to operate the multifuel power source 150. As the variables change, the user may correspondingly change the fuel used to operate the power source 150. For example, the user may determine that the price of diesel fuel is less than that of the lean natural gas and field gas, and may therefore switch over primary operation of the multifuel engine 150 to that of the diesel fuel line 140. In other cases, the reverse may be true, and the user may switch primary operation of the multifuel power source 150 over to the mixed gas. And even in embodiments where the power source 150 is not a multifuel power source, such determinations may be made regarding the ratio of field gas and mixing gas.

Figure 4:
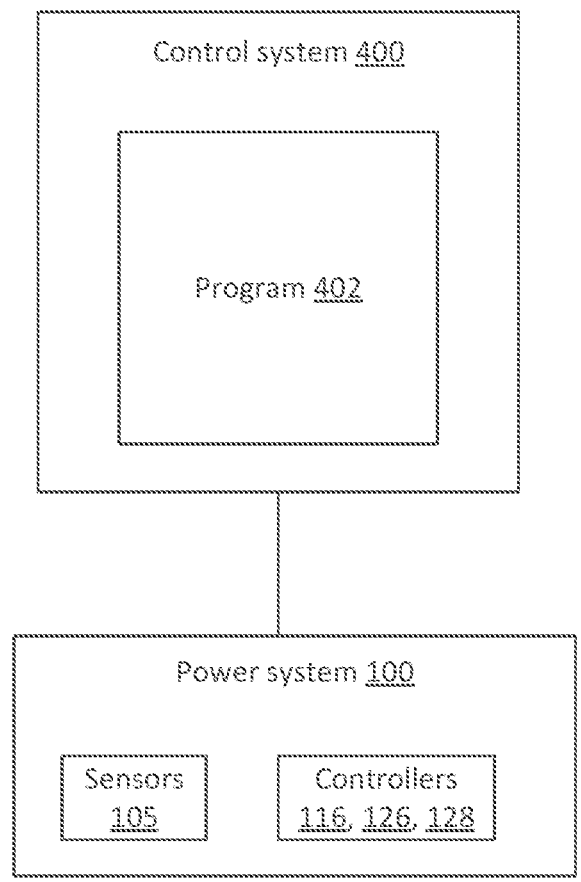
FIG. 4 is a schematic depicting a control system according to an embodiment of the present disclosure.

In some embodiments, the ratio and/or rate of field gas and lean natural gas mixture to be combined may be determined automatically, such as by using one or more computer programs 402 and/or control systems 400, as shown in FIG. 4. For instance, the multifuel power system 100 may use electronics 105 (e.g., sensors) to determine the quality/amount of the field gas being produced by the field gas source 122 or of the quality of the mixed gas supply. The computer program(s) 40 control system 400, in communication with the electronics 105, may then direct the system 100 to deliver more or less lean natural gas based on that determination. As another example, the electronics 105 may determine that it would lessen fuel costs if the multifuel power source 150 were to use a different type of fuel, and the system 100 may be correspondingly adjusted. In a further example, the electronics 105 may measure emissions from the power source 150 and the computer program(s) 402/control systems 400 may then make a determination based on the measured emissions. It may also be possible for the computer program(s) 402 and/or control systems 400 to provide a prediction of emissions from the power source 150 without actually measuring any emissions. The computer program(s) 402/control systems 400 then direct the power system 100 to switch to or from the lean natural gas line 110 and field gas line 120 mixture based on information from the electronics or the predicted emissions.

In addition to sensing one or more properties of the field gas (e.g., content, temperature, pressure, phase, dewpoint, flow rate, density, presence of particulates/solids/foreign objects, etc.), measuring emissions from the power source 150, predicting emissions from the power source 150, and/or determining at least one change in condition of the field gas (e.g., availability, value/cost, etc.) and using that data to determine a ratio of mixing gas to field gas, the computer program(s) 402/control systems 400 may further or alternately determine a ratio of mixing gas to field gas based on at least one sensed property of the mixing gas (e.g., content, temperature, pressure, phase, dewpoint, flow rate, density, presence of particulates/solids/foreign objects, etc.), at least one change in condition of the mixing gas (e.g., availability, value/cost, etc.), direct feedback from the power source 150 (e.g., cylinder pressure, cylinder temperature, gas quality, engine knock, etc.), and/or indirect feedback from the power source 150 (e.g., whether running, whether using gas mixture, whether working at full available load or derating, et cetera).

Figure 2:
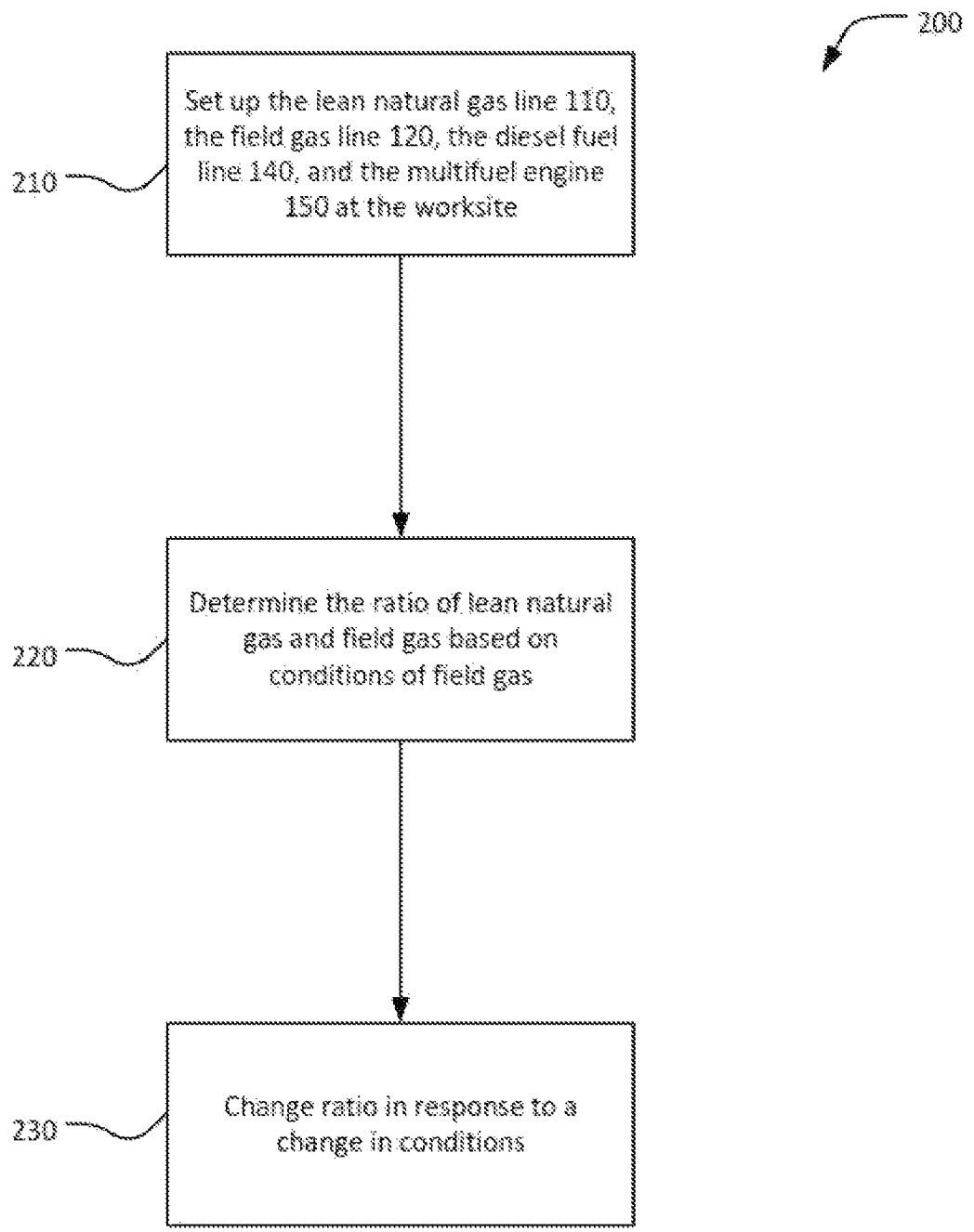
FIG. 2 is a flow chart illustrating a method of using the multifuel power system of FIG. 1.

FIG. 2 is a flow chart illustrating a method 200 of making and using the system 100, in an embodiment. First, at step 210, the lean natural gas line 110, the field gas line 120, and the diesel fuel line 140 are operably connected to the multifuel power source 150 at a work site. Then, at step 220, a ratio of lean natural gas to field gas is made based on the conditions of the lean natural gas and the respective gases are mixed. In response to changing conditions (e.g., fuel price, fuel availability, fuel quality, etc.), at step 230, a change in the ratio of lean natural gas to field gas may be made (e.g., automatically or manually).

The steps of the method 200 may be modified, added to, and/or omitted as desired, and such considerations have been contemplated and are within the scope of the present disclosure. Moreover, similar steps may be taken with other power sources 150 (e.g., engine-powered generators and turbine-powered generators).

Figure 3:
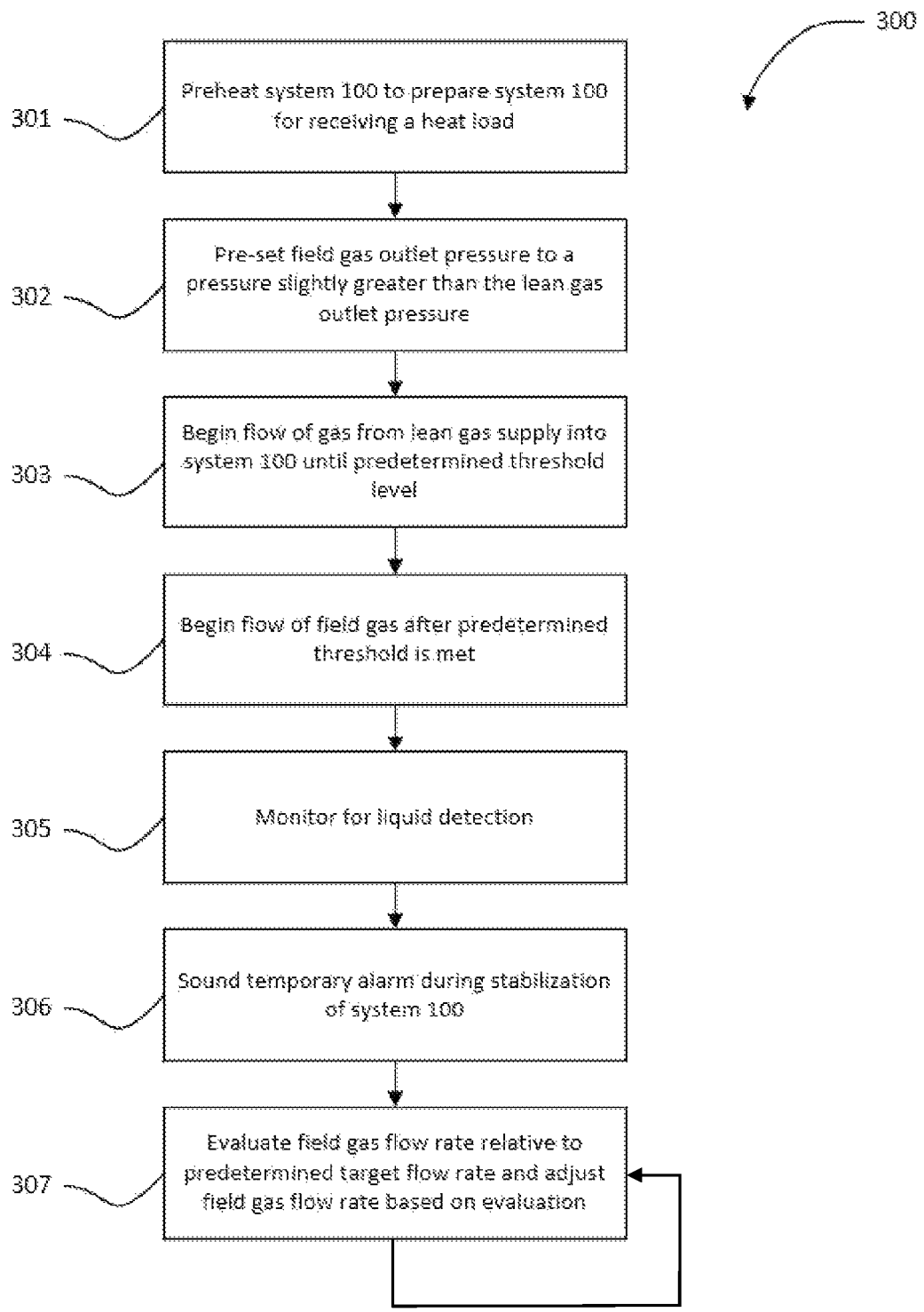
FIG. 3 is a flow chart illustrating a method for delivering field gas within the multifuel power system of FIG. 1.

FIG. 3 is a flow chart illustrating a method 300 for delivering natural gas within the system 100. The method 300 begins at step 301 by preheating the system 100 to prepare for the system 100 receiving a heat load. At step 302, the field gas outlet pressure is pre-set to a pressure slightly greater than the lean gas outlet pressure. This may be accomplished automatically or manually, as is known in the art. At step 303, gas from the lean gas supply flows into the system 100 until a predetermined threshold is met. The predetermined threshold may be based on, for example, a minimum total flow rate, a minimum lean gas flow rate, a stabilized flow rate, or a certain period of time (e.g., time elapsed since the start of flow). At step 304, once the predetermined threshold has been met, the field gas flow begins. Liquid detection is monitored at step 305. Such monitoring may be accomplished by, for example, evaluating field gas temperature, methods to detect phase such as a flow meter, or evaluating filter differential pressure. While the system 100 is stabilizing, at step 306, an expected temporary alarm will trigger, which may be bypassed. If the expected temporary alarm does not trigger, step 306 may be skipped. Finally, at step 307, the field gas flow rate is evaluated, and if the flow rate is not at a predetermined target flow rate, the flow rate of the field gas is increased or decreased to the target flow rate. Step 307 runs continuously, evaluating the target flow rate of field gas and adjusting the flow rate accordingly, until the power source no longer requires a fuel supply.

The power system 100 embodiments described herein may provide for engine-powered generators, turbine-powered generators, and multifuel power systems that do not suffer from the same drawbacks as conventional multifuel power systems. For example, the system 100 may forego the infrastructure typically required to treat the field gas extracted from the work site, since the field gas is effectively treated by the lean natural gas supplied by the natural gas trailer 112. This may cut the cost and time normally associated with the manufacture, transport, and setup of the field gas treatment infrastructure. Further, the system 100 may provide for a natural gas line that may be relatively unaffected by a sudden shortage in the field gas availability. Whereas conventional multifuel power systems may have to rely on the diesel fuel line to operate the multifuel power in such cases, the system 100 may not. Instead, the system 100 may simply increase the amount of lean natural gas supplied by the natural gas trailer 110 to make up for the deficiency.

Based on the foregoing, it shall be appreciated by those of skill in the art that the mixed gas system 100 described herein provides a means for operating a fuel power source utilizing field gas without requiring the field gas to be pre-treated. More specifically, the system may achieve mixed gas requirements for use with a fuel power source without the need for traditional requisites, such as constant production of byproducts that require proper management with onsite storage vessels that are regularly emptied with a rotation of other transport trailers, a liquid line running to/from the work site, additional buyback meters to return byproducts, and/or a flare. The system may therefore reduce the pipeline infrastructure required at the work site, and the need for temporary storage vessels. Additionally, the system may produce useful mixed fuel without needing additional methanol injection and storage of such chemicals onsite. Still further, the system is not sensitive to changes in ambient temperature, pressure of the field gas supply, temperature of the field gas supply, or even the field gas supply rate. The system may be easily started and stopped and can be quickly and easily scaled up or down depending on the current needs of the project. And the system may reduce safety risks, such as risks relating to flares and onsite storage.

In various embodiments, the field gas may be trucked, piped, rich, lean, raw, partially treated, or fully treated. While the supplemental and mixing fuels used herein as examples were primarily diesel and natural gas fuels, the artisan will understand that the power system embodiments described herein may use any suitable fuel to operate a power source, and that such considerations are fully contemplated herein. In some embodiments, specific forms of mixing gas are provided as compressed natural gas or liquid natural gas. Moreover, while lean mixing gas (e.g., lean natural gas) is repeatedly discussed as being mixed with the field gas, the mixing gas may alternately be a rich mixing gas (e.g., rich natural gas). This may be particularly desirable, for example, when the field gas is lean. As with the field gas, the supplemental and mixing gases may be trucked or piped and may have a range of properties.

Additionally, the systems set forth herein may automatically provide additional substances (e.g., hydrogen, propane, air, et cetera) to the field gas to alter BTU content, emissions, and other properties. In such embodiments, the power source may or may not be capable of operating from these mixing gasses alone.

The artisan will understand that the power system embodiments disclosed herein may include or have associated therewith electronics (e.g., a computer, sensors, et cetera). The electronics may be used to control and modify the operation of the various power systems (e.g., to adjust the rate and/or ratio of the lean natural gas and field gas mixture, to switch which fuel is used to operate the multifuel power source 150, et cetera). In some example embodiments, processor or processors used may be configured through particularly configured hardware, such as an application specific integrated circuit (ASIC), field-programmable gate array (FPGA), etc., and/or through execution of software to allow the various electronics to function in accordance with the disclosure herein.

Many different arrangements of the various components depicted, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure. It will be understood that certain features and subcombinations are of utility and may be employed without reference to other features and subcombinations and are contemplated within the scope of the claims. Not all steps listed in the various figures need be completed in the specific order described.

The invention claimed is:

1. A power system, comprising:
  a power source;
  a field gas supply, the field gas supply being extracted from an oil or gas well;
  a natural gas supply;
  a mixing device; and
  a control system configured to operate the power system, the control system in operable communication with one or more sensors and one or more controllers;
  wherein:
    the power system is operable using a gas mixture formed by the mixing device, the mixture comprising field gas from the field gas supply and natural gas from the natural gas supply and having a ratio of field gas to natural gas;
    the ratio of field gas to natural gas is manually or automatically adjusted based on at least one control system determination selected from the group consisting of: a sensed property of the field gas, a change in a condition of the field gas, measured emissions from the power source, predicted emissions from the power source, direct feedback from the power source, indirect feedback from the power source, a sensed property of the natural gas, and a change in a condition of the natural gas; and
    the at least one control system determination is made via the one or more sensors.

2. The power system of claim 1, wherein the power system is operable using natural gas from the natural gas supply.

3. The power system of claim 1, wherein the power source is operable using the field gas from the field gas supply.

4. The power system of claim 1, wherein the ratio of field gas to natural gas is affected by a starting composition of the field gas and a starting composition of the natural gas.

5. The power system of claim 1, wherein the ratio of field gas to natural gas is manually or automatically adjusted based on a change in a condition of the field gas, and the change in a condition of the field gas is an interruption in the field gas supply.

6. The power system of claim 1, further comprising a first apparatus for regulating at least one condition of the field gas from the field gas supply, the first apparatus being selected from the group consisting of: a first heater, a first pressure regulator, and a first flow control valve.

7. The power system of claim 6, further comprising a second apparatus for regulating at least one condition of the natural gas from the natural gas supply, the at least one second apparatus being selected from the group consisting of: a second heater, a second pressure regulator, and a second flow control valve.

8. The power system of claim 7, wherein the at least one first apparatus and the at least one second apparatus are mounted on a single skid.

9. The power system of claim 8, wherein the skid is trailer mounted.

10. The power system of claim 1, wherein the field gas does not undergo a pretreatment before mixing with the natural gas.

11. The power system of claim 1, wherein the mixed gas is odorized.

12. The power system of claim 1, wherein field gas for the field gas supply is delivered to the system via trailer or pipeline.

13. The power system of claim 12, wherein the field gas is:
- lean or rich; and
- raw, pre-treated, or fully treated.

14. The power system of claim 1, wherein the power source is an engine-powered generator, a turbine-powered generator, or a multifuel power source.

15. The power system of claim 1, further comprising a supplemental fuel supply, the power source being operable using supplemental fuel from the supplemental fuel supply.

16. The power system of claim 15, wherein the supplemental fuel is diesel.

17. The power system of claim 15, wherein the power system is operable using natural gas from the natural gas supply.

18. The power system of claim 1, wherein:
- the natural gas is lean natural gas or rich natural gas; and
- the natural gas is delivered to the system via trailer or pipeline.

19. A power system, comprising:
- a power source;
- a field gas supply, the field gas being extracted from an oil or gas well;
- a mixing gas supply; and
- a mixer configured to automatically mix field gas from the field gas supply and mixing gas from the mixing gas supply to create a gas mixture, wherein a ratio of the field gas to the mixing gas in the gas mixture is automatically adjusted via a control system in operable communication with one or more sensors and one or more controllers and is based at least partially on an item selected from the group consisting of: a property of the field gas, a change in a condition of the field gas, measured emissions from the power source, predicted emissions from the power source, direct feedback from the power source, indirect feedback from the power source, a property of the mixing gas, and a change in a condition of the mixing gas, wherein the item is determined via the one or more sensors;
- wherein the control system is configured to automatically select between the field gas and the gas mixture and automatically provide the selected item to the power source; and
- wherein the power system is operable using the field gas or the gas mixture.

20. The power system of claim 19, further comprising a supplemental fuel supply; and wherein:
- the means for automatically selecting is means for automatically selecting between the field gas, the gas mixture, and supplemental fuel from the supplemental fuel supply; and
- the power system is operable using the supplemental fuel.

21. The power system of claim 19, wherein the power system is operable using the mixing gas.

22. The power system of claim 19, wherein the mixing gas is lean natural gas or rich natural gas.

23. A method for operating a power system, comprising:
- providing a power source, a mixing gas line, a field gas line, and a control system in operable communication with at least one sensor, the control system operably connecting the mixing gas line and the field gas line to the power source at a work site;
- determining, via the control system, an item selected from the group consisting of: a condition of field gas in the field gas line, a change in a condition of the field gas, measured emissions from the power source, predicted emissions from the power source, direct feedback from the power source, indirect feedback from the power source, a sensed property of the mixing gas, and a change in a condition of the mixing gas;
- automatically determining a ratio of mixing gas to field gas based on the determination of the computing system;
- combining mixing gas from the mixing gas line and field gas from the field gas line based on the determined ratio; and
- operating the power source at least part time with the combined mixing gas and field gas.

24. The method of claim 23, wherein the change in at least one condition of the field gas is an interruption in the field gas supply.

25. The method of claim 23, wherein the ratio of mixing gas to field gas is automatically adjusted.

26. The method of claim 23, wherein the power source is an engine-powered generator, a turbine-powered generator, or a multifuel power source.

27. The method of claim 23, further comprising:
- flashing field gas liquids in the field gas line prior to combining the field gas with the mixing gas.

28. The method of claim 23, further comprising:
- operably connecting a supplemental fuel line to the power source at the work site; and
- operating the power source at least part time with supplemental fuel from the supplemental fuel line.

29. The method of claim 28, wherein the supplemental fuel is diesel and the mixing gas is lean natural gas or rich natural gas.

30. The method of claim 23, wherein the mixing gas is at least one gas selected from the group consisting of: lean natural gas, rich natural gas, hydrogen, propane, and air.

\* \* \* \* \*